(12) United States Patent
Bundi (10) Patent No.: US 11,589,105 B2
(45) Date of Patent: Feb. 21, 2023

(54) METHOD, DEVICE AND SYSTEM FOR CONTROLLING CONTENT DISPLAY

(71) Applicant: REZONENCE LIMITED, London (GB)

(72) Inventor: Prashanth Naidu Bundi, London (GB)

(73) Assignee: REZONENCE LIMITED, London (GB)

( * ) Notice: Subject to any disclaimer, the term of this patent is extended or adjusted under 35 U.S.C. 154(b) by 0 days.

(21) Appl. No.: 16/606,953

(22) PCT Filed: Apr. 23, 2018

(86) PCT No.: PCT/GB2018/051060
§ 371 (c)(1),
(2) Date: Oct. 21, 2019

(87) PCT Pub. No.: WO2018/193274
PCT Pub. Date: Oct. 25, 2018

(65) Prior Publication Data
US 2020/0196003 A1 Jun. 18, 2020

(30) Foreign Application Priority Data
Apr. 21, 2017 (GB) .................................. 1706386

(51) Int. Cl.
| H04N 21/431 | (2011.01) |
| H04N 21/234 | (2011.01) |
| H04N 21/454 | (2011.01) |
| H04N 21/81 | (2011.01) |

(52) U.S. Cl.
CPC ... *H04N 21/4316* (2013.01); *H04N 21/23424* (2013.01); *H04N 21/454* (2013.01); *H04N 21/812* (2013.01)

(58) Field of Classification Search
CPC ......... H04N 21/4316; H04N 21/23424; H04N 21/454; H04N 21/812; H04N 21/8543; H04N 21/4622; H04N 21/4782
See application file for complete search history.

(56) References Cited

U.S. PATENT DOCUMENTS

| 9,760,911 B2 * | 9/2017 | Brown ............... G06Q 30/0277 |
| 9,973,830 B1 * | 5/2018 | Shetty .................. H04N 21/812 |
| 2010/0269030 A1 * | 10/2010 | Dugonjic ............... G06Q 30/02 715/835 |
| 2014/0143670 A1 * | 5/2014 | Swaminathan ....... G06F 3/0481 715/720 |
| 2016/0217497 A9 | 7/2016 | Singhal |
| 2016/0227297 A1 * | 8/2016 | Bennett ............ H04N 21/25833 |

OTHER PUBLICATIONS

International Search Report for PCT/GB2018/051060, dated Jun. 27, 2018, 3 pages.
Written Opinion of the ISA for PCT/GB2018/051060, dated Jun. 27, 2018, 7 pages.

* cited by examiner

*Primary Examiner* — Nathan J Flynn
*Assistant Examiner* — Christine A Kurien
(74) *Attorney, Agent, or Firm* — Nixon & Vanderhye, P.C.

(57) ABSTRACT

The present invention relates to a method for displaying content within an electronic device. The method including the steps of: displaying part of the content; displaying an ad comprising a video; and revealing at least part of the remainder of the content once the ad has played back at least a portion of the video. A device and system are also disclosed.

17 Claims, 6 Drawing Sheets

//  METHOD, DEVICE AND SYSTEM FOR CONTROLLING CONTENT DISPLAY

This application is the U.S. national phase of International Application No. PCT/GB2018/051060 filed 23 Apr. 2018, which designated the U.S. and claims priority to GB Patent Application No. 1706386.8 filed 21 Apr. 2017, the entire contents of each of which are hereby incorporated by reference.

FIELD OF INVENTION

The present invention is in the field of controlling the display of content. More particularly, but not exclusively, the present invention relates to display of advertising and content on electronic devices.

BACKGROUND

Electronic devices for users, such as smartphones, tablets, and computers, are used to display content to the users via electronic displays.

Display of the content is generally controlled by applications, such as native apps or browsers, and mediated via the operating system for output on the electronic displays.

There is a desire to control display of the content on electronic devices by providing a gatekeeper function. The gatekeeper function may force users to perform an action before certain content is displayed.

Traditional advertising on electronic devices, such as online advertising or in-app advertising, may be provided via banner advertisements, pop-up advertisements, or pre-roll video.

Pre-roll video requires a users to view all or part of a video ad before video content is screened. Typical pre-roll video is utilised on YouTube to monetise video content.

In this way, pre-roll video provides a form of gatekeeper function forcing users to view the pre-roll video before access to video content is provided.

There is a desire for improved video ad display methods and systems to provide a gatekeeper function for content which provide improved user visibility and interaction of/with the video ad.

It is an object of the present invention to provide a method, device and system which overcomes the disadvantages of the prior art, or at least provides a useful alternative.

SUMMARY OF INVENTION

According to a first aspect of the invention there is provided a method for displaying content within an electronic device, including:
Displaying part of the content;
Displaying an ad comprising a video; and
Revealing at least part of the remainder of the content once the ad has played back at least a portion of the video.
According to another aspect of the invention there is provided a method for displaying content within an electronic device, including: method for displaying content within an electronic device, including:
Displaying a video ad within a web-page;
Revealing the content within the webpage once the video ad has played back at least a portion of the video;
Wherein the video ad remains visible for at least a period of time once the content is displayed.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides methods, devices, and systems for displaying content within an electronic device.

The inventor has discovered that ads comprising video can be usefully used to provide gatekeeper functions in relation to all types of content, including visually static content such as images or text.

Furthermore, the inventor has discovered that leaving the ad visible, once the gatekeeper function has been performed, may improve visibility of the ad.

In addition, the inventor has discovered that displaying a part of the content before the video ad has played may encourage users to access the remainder of the content by playing the video ad.

Figure 1:
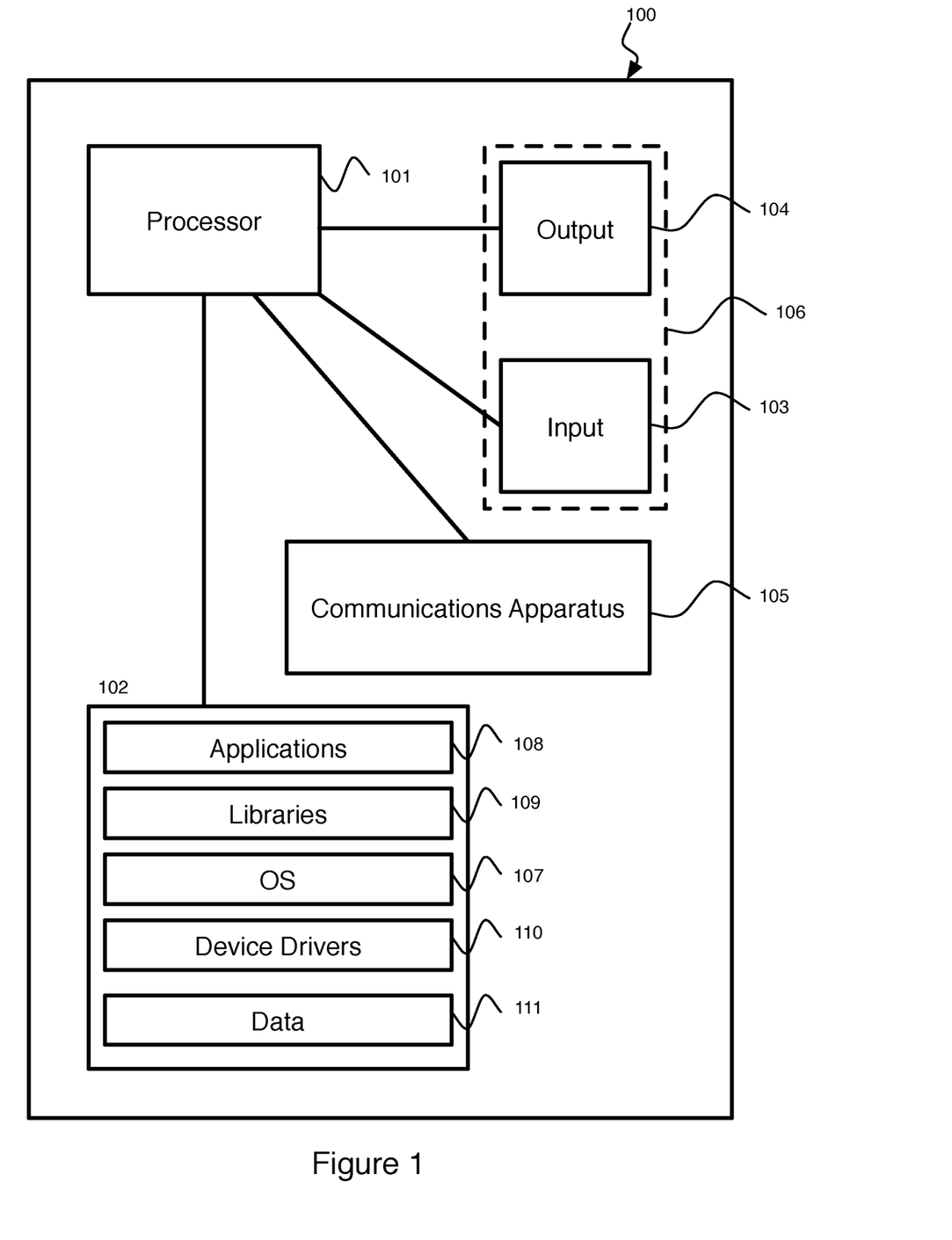
FIG. 1: shows a block diagram illustrating a device in accordance with an embodiment of the invention.

In FIG. 1, an electronic device 100 in accordance with an embodiment of the invention is shown.

The device 100 includes a processor 101, a memory 102, a user input apparatus 103, and a display apparatus 104. The device 100 may also include a communications apparatus 105.

The input apparatus 103 may include one or more of a touch/near-touch input, an audio input, a keyboard, a pointer device (such as a mouse), or any other type of input.

The display apparatus 104 may include one or more of a digital screen (such as an LED or OLED screen), an e-ink screen, or any other type of display.

The input and display apparatuses 103 and 104 may form an integrated user interface 106 such as a touch or near-touch screen.

The device 100, or at least parts of the device, may constitute a personal computing device such as a desktop or laptop computer, or a mobile device 100, such as a smartphone, a smart-watch, a tablet, or a VR headset. The device 100 may include a common operating system 107 such as Apple iOS, Google Android, or Microsoft Windows Phone for mobile devices or Microsoft Windows or Apple OSX for personal computing devices.

In one embodiment, the processor 101 may be configured to display part of content on the display apparatus 104, to display an ad comprising a video on the display apparatus 104, and to reveal at least part of the remainder of the content once the ad has played back at least a portion of the video.

In one embodiment, the processor 101 may be configured to display an ad comprising a video on the display apparatus 104, to reveal at least part of the remainder of the content once the ad has played back at least a portion of the video, and to keep the ad visible once the at least part of the remainder of the content is revealed.

The processor 101 may be configured to execute an application, such as a browser or mobile app, to display the content and ad. The processor 101 may be configured to execute an advertising module within the browser or mobile app to control display of the ad and to control revealing of the remainder of the content.

The memory 102 may be configured to store software applications 108, libraries 109, the operating system 107, device drivers 110, and data 111.

The processor 101 is configured to execute the software applications 108, libraries 109, operating system 107, and device drivers 110, and to retrieve data 111.

The communications apparatus 105 may be configured to communicate with one or more other devices or servers via a communications interface such as wifi, Bluetooth, and/or cellular (e.g. 2G, 3G, or 4G) and/or across a network (such as a cellular network, a private LAN/WLAN and/or the Internet).

Figure 2:
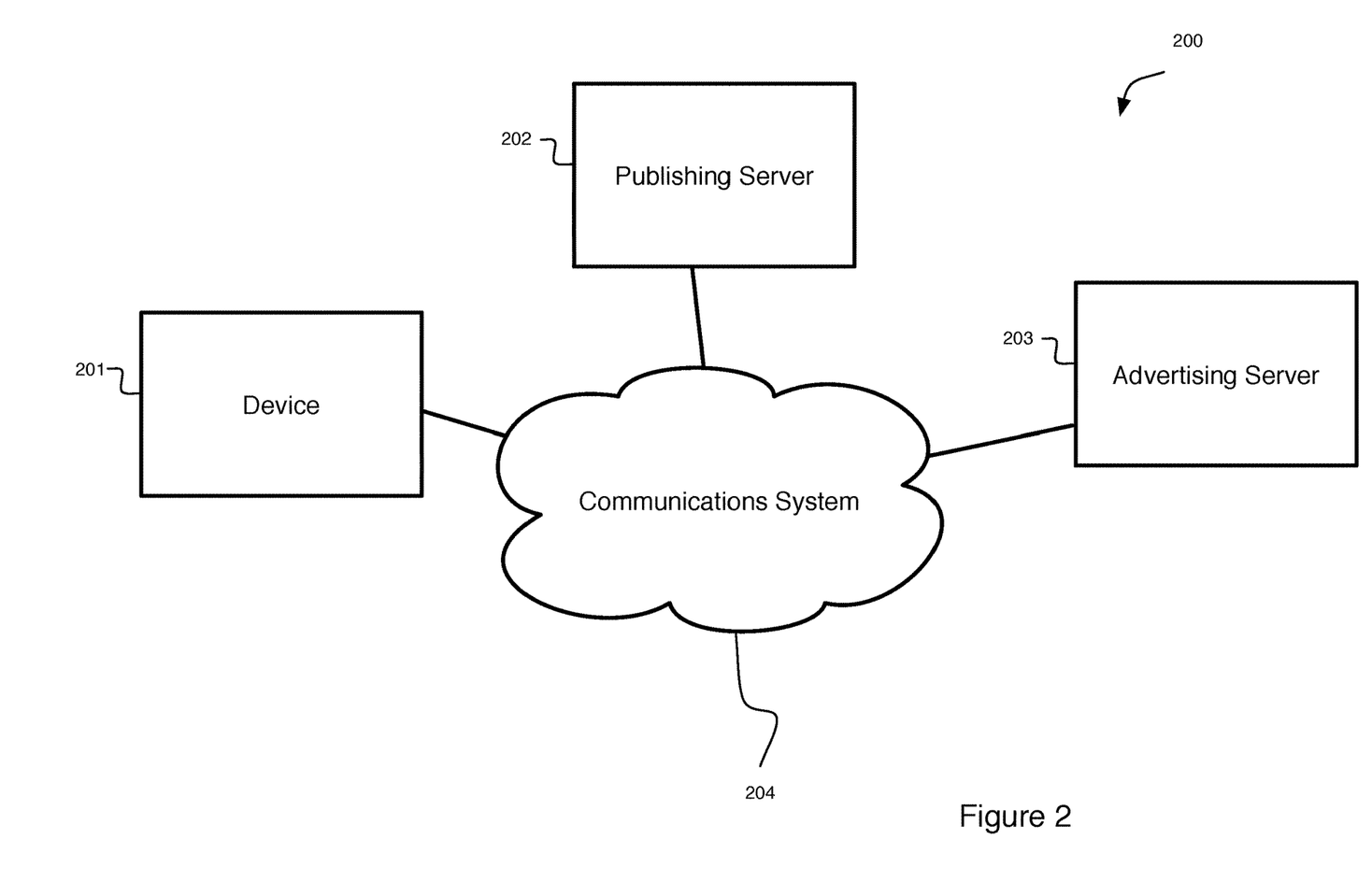
FIG. 2: shows a block diagram illustrating a system in accordance with an embodiment of the invention.

In FIG. 2, a system 200 in accordance with an embodiment of the invention is shown.

A device 201 (which may be device 100) is shown. The device 201 may be configured to communicate via a communication apparatus (e.g. 105) with a publishing server 202 and an advertisement server 203 via a communications system 204 which may comprise a network or plurality of networks.

The device 201 may be configured to receive content from the publishing server 202.

The content may include an advertising module or a link to an advertising module.

The device 201 may be configured to display a part of the content.

The device 201 may retrieve the advertising module, for example, using the link to the module, from, for example, the advertising server 203.

The device 201 may be configured to execute the advertising module. During execution, the advertising module may retrieve an ad comprising video from the advertising server 203, display an ad comprising a video on the device 201, and to reveal at least part of the remainder of the content once play back of at least a portion of the video is complete.

The advertising module may be written in Javascript and may form part of, or integrate with, an HTML web-page. The device 201 may execute the advertising module within a browser executing on the device 201.

Figure 3:
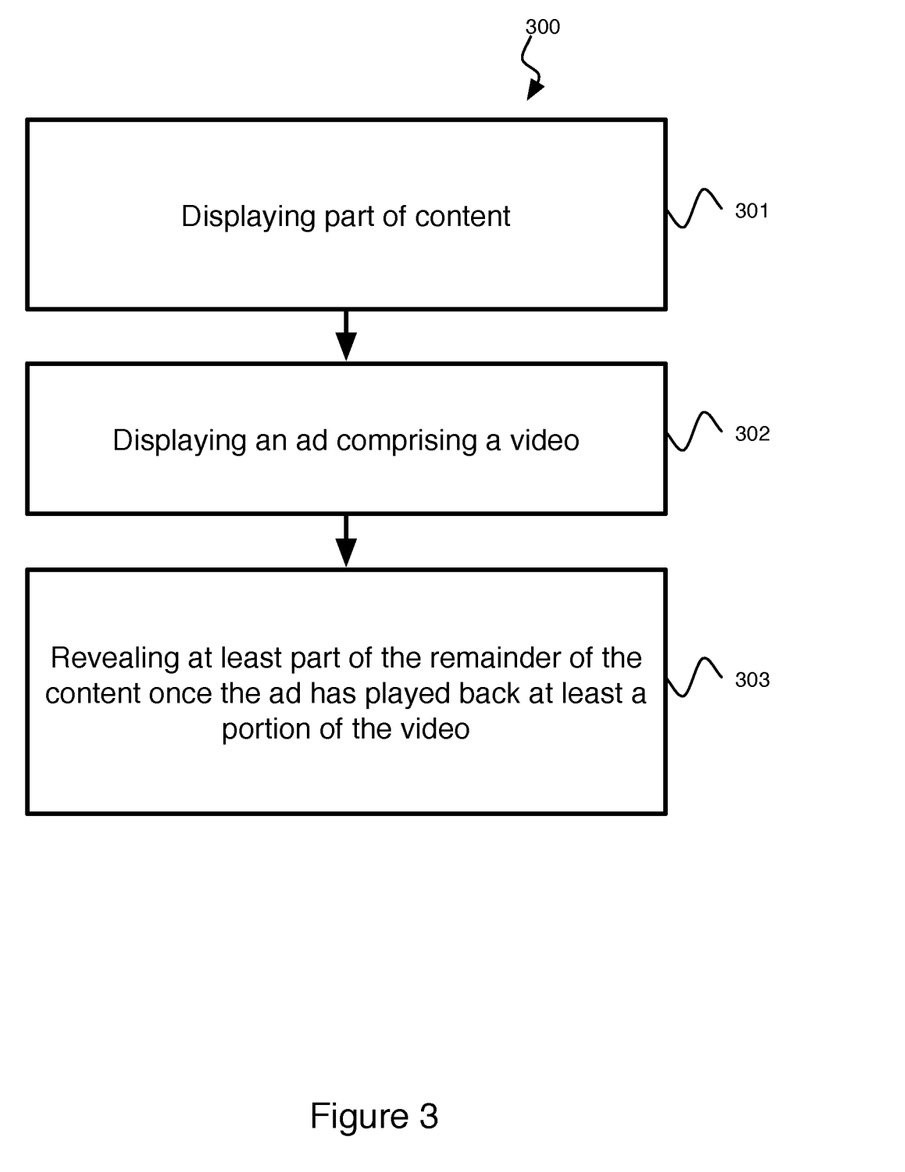
FIG. 3: shows a flow diagram illustrating a method in accordance with an embodiment of the invention.

Referring to FIG. 3, a method 300 in accordance with an embodiment of the invention will be described.

In step 301, part of content may be displayed on the electronic device. The content may be visually static content such as text or images. The part of the content may be displayed within a first web-page rendered within a browser on the electronic device. In one embodiment, the part of the content may be displayed within a native app executing on the electronic device. The content may be displayed within a first display area.

In one embodiment, the content or the part of the content may be initially retrieved by the electronic device from a publishing server. In another embodiment, the content may exist within a native/mobile app previously downloaded to the electronic device.

In step 302, an ad comprising video may be displayed on the electronic device. The ad may be displayed in a second display area. The first and second display areas may be within the same scrollable page or same web-page within the browser.

In one embodiment, user input is received to initiate play-back of the video. User input may be received via a displayed user interface element such as a playback icon or text.

The video may be displayed within the second display area. In one embodiment, the video is displayed within a light-box overlaying at least part of the first and second display areas. In another embodiment, the video is displayed within a new web-page or window.

The display of the ad may be controlled by an advertising module at the electronic device. The advertising module may be retrieved from an advertising server or from the publishing server. The ad may retrieved from the advertising server. The advertising module may be written in a scripting language such as Javascript and may be executed by the electronic device within a browser.

In step 303, at least part of the reminder of the content may be revealed once the ad has played back at least a portion of the video. The at least part of the remainder of the content may be displayed within a third display area. The third display area may be within the same scrollable page or same web-page as the first and second display areas.

In one embodiment, the remainder of the content is revealed once the ad has played back a predefined portion of the video. The predefined portion is defined by time, for example, the first 5 seconds of the video.

In one embodiment, once the ad has played back a predefined portion of the video, a user interface element, such as a skip icon or text, is displayed that upon actuation by user input, results in revealing of the remainder of the content.

When the at least part of the remainder of the content is revealed, play-back of the video may be paused, for example, if the video becomes at least partially non-visible due to scrolling of the page in which it is displayed or due to any other action such as selection or display of another web-page or light-box. In one embodiment, continued play back of a paused video occurs once a user interface element, such as a continue or play icon/button, is actuated in response to user input otherwise the video may remain paused even if the video is made visible again due to scrolling.

The ad may remain displayed when the least part of the remainder of the content is revealed. In one embodiment, while the ad remains displayed, the video may continue to play back. The ad may remain displayed until the user scrolls away or selects another web-page or screen change, or until the expiration of a period of time.

Once the video has played-back in its entirety, the ad may replace the video with visually static content, such as an image.

In one embodiment, the content is gradually revealed as the video plays back.

In one embodiment, step 301 is not used such that part of the content is not initially displayed; the remainder of the content is, therefore, all the content; and all the content is displayed once at least a portion of the video has played back.

An embodiment of the present invention will now be described with reference to FIGS. 4 and 5.

Figure 4:
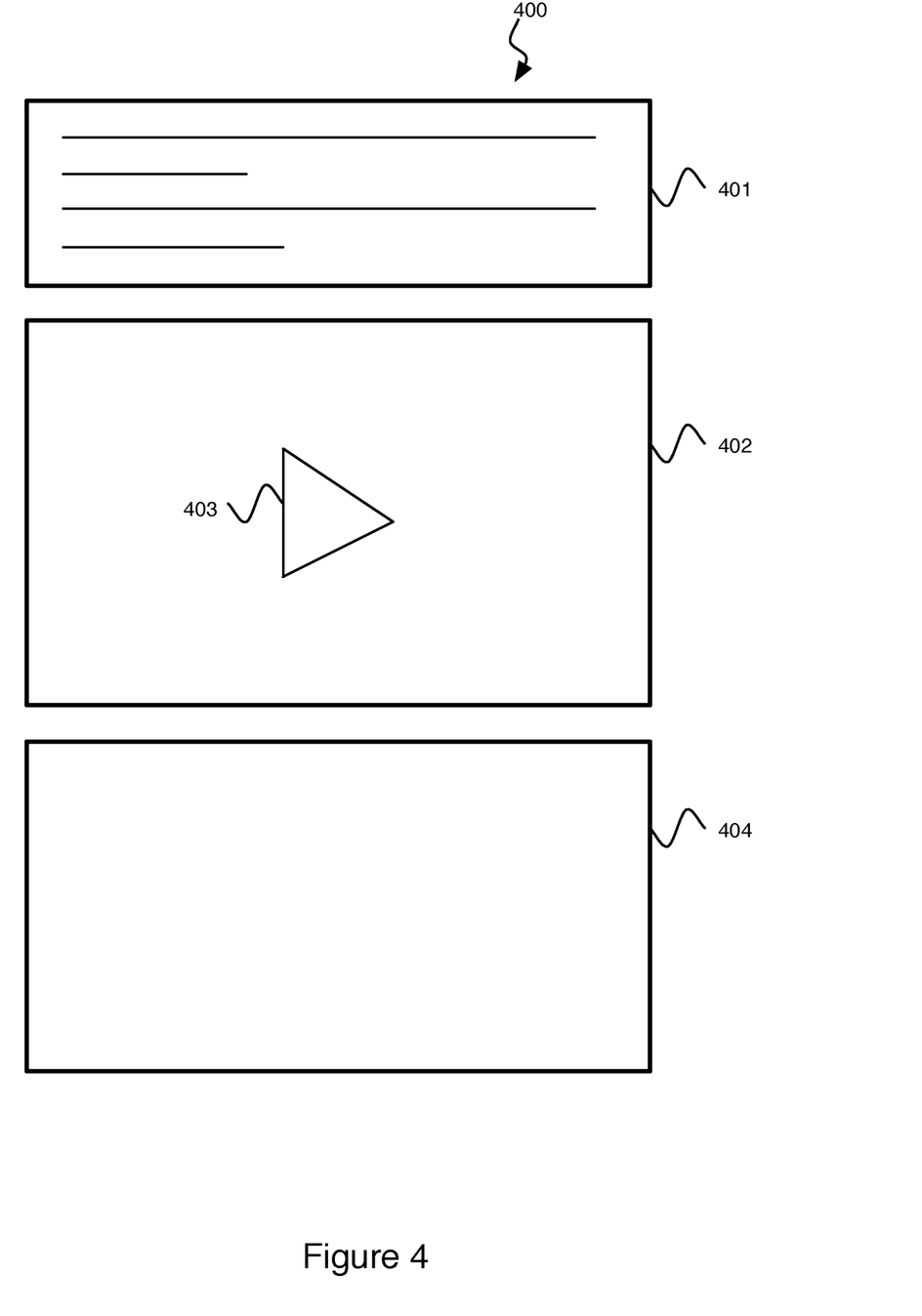
FIGS. 4 and 5:
show wireframe screenshots illustrating an embodiment of the invention.

FIG. 4 shows a wireframe screen 400 illustrating display of part of content in display area 401. In display area 402, a user interface element 403 is displayed. In display area 404, the remainder of the content is either non-visible or obscured.

User input may be received at user interface element 403 to initiate play back of the video for an ad in display area 402.

It will be appreciated that in an alternative embodiment, there is no display area 401 and no content is displayed until play back of the video has reached a specific point.

Figure 5:
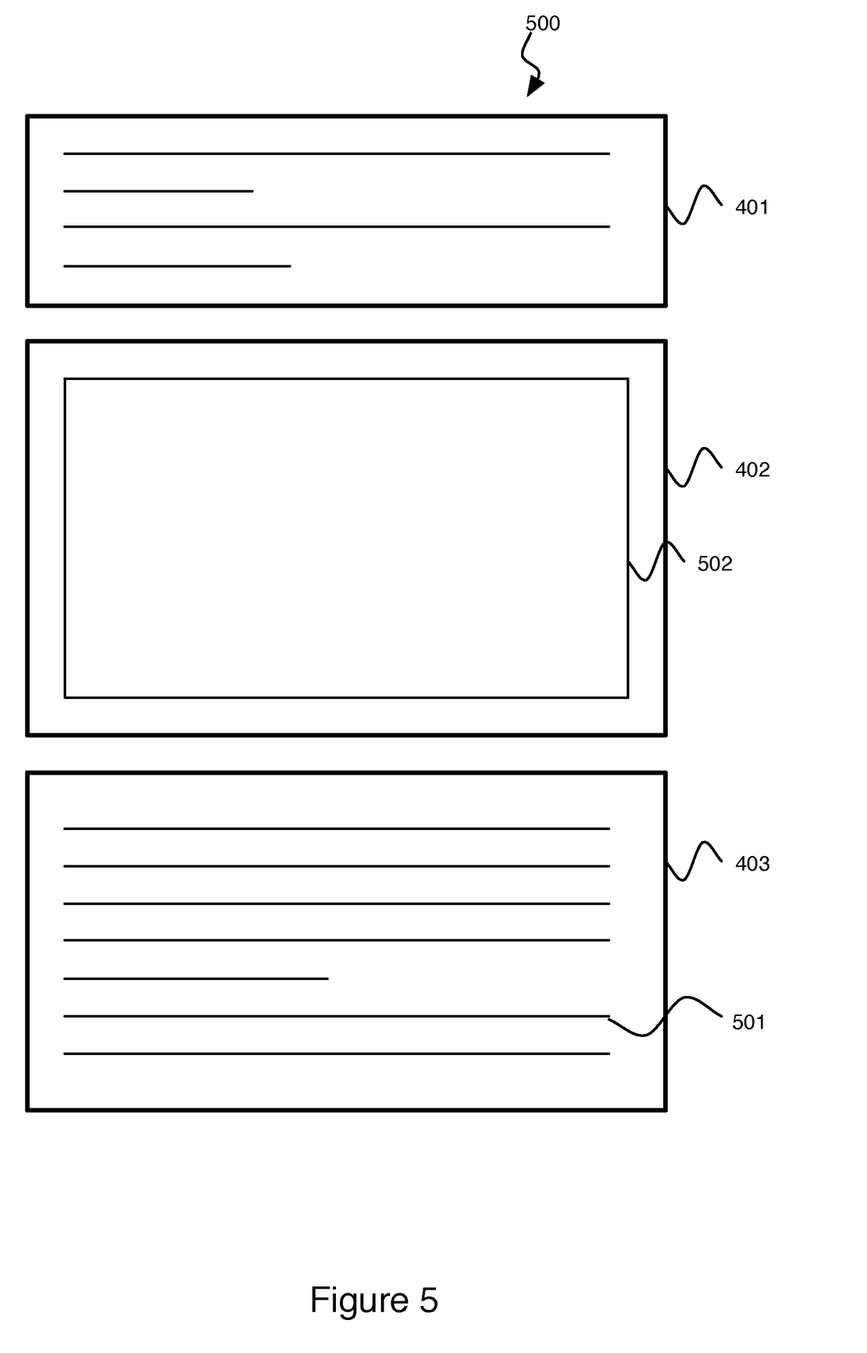

FIG. 5 shows a wireframe screen 500 illustrating the revealing of the remainder of the content 501 in display area 404 once play back of the video 502 in display area 402 has reached a specific point.

Figure 6:
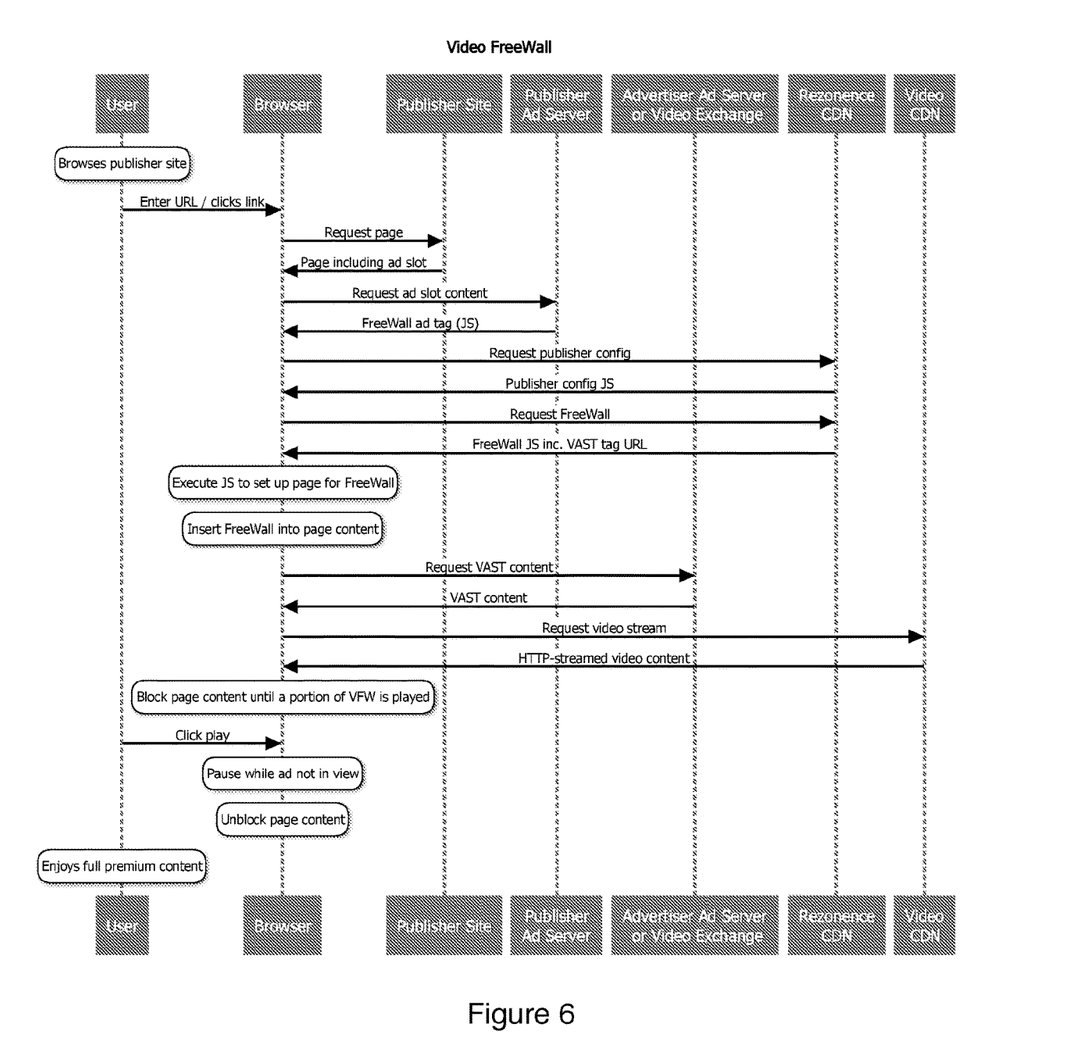
FIG. 6: shows a sequence diagram illustrating a method in accordance with an embodiment of the invention.

Embodiments of the invention will be described with reference to FIG. 6. Embodiments will be described as FreeWall™ or Video FreeWall™.

Standard Delivery

After the user has navigated to a publisher's article where FreeWall is being delivered, a FreeWall® tag will is sent from the publisher's ad server to an ad slot on the page, specified by the publisher.

Once the FreeWall® tag is delivered onto the page, a request to the Rezonence CDNs is made to retrieve the loaders for that FreeWall®'s files. The loaders then execute on the page, causing simultaneous requests to be made to retrieve the FreeWall®'s AdCode file, and the relevant publisher configuration file for the site the FreeWall® is operating on.

The JavaScript from the AdCode and publisher configuration then execute on the page. The publisher configuration puts placeholders in the site's content for the FreeWall® to load into and hides the rest of the page, and then the AdCode file loads the FreeWall® and its assets into the placeholder. As part of this process, a VAST microsite is created within the FreeWall®, which when loaded requests VASTNPAID content via the Google IAM SDK.

The response from the VASTNPAID request is returned in an XML format which is managed by Google's IAM SDK. FreeWall® then interacts with the SDK to make the VASTNPAID compatible with the Video FreeWall® player. Once the user has clicked on the Video FreeWall® play button, a request is sent via the IAM SDK, requesting a video stream. The video stream contacts the advertiser's ad server, and returns video content.

After a specified amount of the video has played, the rest of the publisher content is unlocked, and the user has access to the rest of the article. They can then choose to continue watching the video if it hasn't already finished, or read the rest of the publisher content. The amount specified is provided when the FreeWall® is created. In one embodiment this defaults to 6 seconds, however if the video is shorter than 6 seconds, the Video FreeWall® will unlock when the video is complete.

If at any point during the request of the video, or the playing of the video, an error is detected, or a significant amount of time passes without any response from the advertiser's ad server, or detection of the video not playing occurs, then a safety or load timeout gets triggered causing the Video FreeWall® to collapse, and the publisher's content to unlock. The load timeout may be up to 6 seconds without response. The safety timeout is the load timeout, plus the article unlock timeout, plus 1 second, for example. With the 6 second unlock default, that permits 13 seconds to pass before the safety timeout gets triggered.

Programmatic Delivery

An alternative way of delivering VASTNPAID to Video FreeWall® is programmatically.

Using AppNexus, a programmatic sell-side and buy-side platform, it's possible for programmatic buyers to bid on impressions made available by the Video FreeWall® on the publisher site, and deliver their own VASTNPAID video directly to the Video FreeWall® unit. This allows the programmatic buyer to directly control their spend by choosing which impressions to buy. This can be dictated by audience segmentation, geographic targeting, frequency capping, etc.

A product called DoubleServe which allows publisher inventory to be reused after FreeWall® has been delivered through one of their ad slots may be used to dynamically determine which ad slot the FreeWall® was delivered through, and then refresh the ad slot. This allows the next item in the publisher's ad slot to fill the ad slot.

DoubleServe uses prebid; a header bidding technology, in order to determine whether there is any demand available for the inventory that Video FreeWall® has made available. This means that FreeWall® can determine if it should activate on the page based on whether or not any demand is available, meaning the impression isn't wasted when there's no demand.

When demand is available, DoubleServe dynamically creates an AppNexus VAST placement script which is associated to the specific publisher it's running on. The buyer's DSP is made aware of the impression that has been made available, and delivers the VASTNPAID tag to it.

When the VASTNPAID tag has been received by DoubleServe, a Video FreeWall® is dynamically created, with the vast tag injected into it. From here, the VASTNPAID tag is passed into Google's IAM SDK, and executes in the same means described in the standard delivery method. By requesting VASTNPAID content via the Google IAM SDK, which returns VASTNPAID content in XML format.

Then when a user clicks to play the video, a request is made via the XML content, handled by the Google IAM SDK, which then returns a video stream from the advertiser's ad server.

The same load and safety timeout rules specified in the standard delivery mechanism also apply in the programmatic delivery mechanism.

Video FreeWall Embed Code

Sample Minimal HTML Example

Below is a sample of the Video FreeWall® on a HTML web page. In the head of the code snippet is the Video FreeWall® tag which pulls in all of the assets, creating the code snippet shown in the body tag.

```
<html>
    <head>
        <!-- Video FreeWall tag -->
        <script>
        (function( ) {
            /*
                Third party tracking URLs can be provided between the quotes of
                the push statements below. Note you will need to uncomment the
                relevant line.
```

-continued

A pixel tracking url or click tracking macro can be provided, as an example, the DFP click tracking macro as already been supplied. For full details on how to embed tracking URLs, please see our wiki at https://bitbucket.org/rezonence/rezonence-wiki/wiki/AdOps%20Userguide
```
            */
            function setTrackers( ) {
                /* Impression tracker */
                /*__r3z.trk.imp.push("");*/
                /* View tracker */
                /*__r3z.trk.ivw.push("");*/
                /* Engagement tracker */
                __r3z.trk.eng.push("%%CLICK_URL_UNESC%%");
                /* Click tracker */
                /*__r3z.trk.clk.push("");*/
                /* Video start tracker */
                /*__r3z.trk.vst.push("");*/
                /* Video 25% completed tracker */
                /*__r3z.trk.v25.push("");*/
                /* Video 50% completed tracker */
                /*__r3z.trk.v50.push("");*/
                /* Video 75% completed tracker */
                /*__r3z.trk.v75.push("");*/
                /* Video ended/completed tracker */
                /*__r3z.trk.ven.push("");*/
                /* Trackers for specific answers, repeat below statement with
                    different answer numbers */
                /*__r3z.trk.ans.push({ans:1,trk:""});*/
                /* Viewability javascript */
                /*__r3z.trk.vjs.push("");*/
                /* Use to override the click through urls for the images */
                /*__r3z.ctu = "[CLICK_THROUGH_URL]";*/
            }
            var tag = {
                "aid": "[ADVERTISER_ID]/[CAMPAIGN_ID]/[AD_ID]",
                "nid": "[NETWORK_ID]",
                "cid": "[C0NFIG_ID]",
                "did": "[DEAL_ID]",
                "lnd": "${CPG_ID}",
                "app": false,
                "apd": "${EXT_APP_ID}",
                "dvd": "${DEVICE_AAID}" + "${DEVICE_APPLE_IDA}" + "${DEVICE_WIN_ID}",
                "nta": "https://cdn3.rezonence.com",
                "lda": "LdCDN3.js",
                "ntb": "https://e43e8e18e725ae6b22e0-f9fde0bbc5469096ab6f7c4eba4934a9.ssl.cf3.rackcdn.com",
                "ldb": "LdCDN2.js",
                "rte": "https://mfk43w9xte.execute-api.eu-west-1.amazonaws.com/production/track",
                "pxl": "/Com/SPI.gif",
                "cap": true,
                "pld": "[PLACEMENT_ID]",
                "vtg": "[VAST_TAG]"
            }
            ,tm = (new Date( )).getTime( ), lo = location.hostname, qp, t1, t2, hd, mr, s1, s2, sd;
            qp = "?evt=tagd&aid="+tag.aid+"&nid="+tag.nid+"&did="+tag.did+"&cid="+tag.cid+"&lnd="+parseInt (tag.lnd)+"&pid="+lo+"&apd="+tag.apd+"&adt=fullflex"+"&cab="+tm+"&sid="+(sd=tm+"-"+s4( )+s4( )+s4( )+s4( ))+"&url="+encodeURIComponent(encodeURIComponent(location.href));
            t1 = new Image( ); t1.onerror = function( ) {var t = new Image( ); t.src = tag.ntb+tag. pxl+qp;};
            t1.src = tag.nta+tag.pxl+qp;
            t2 = new Image( ); t2.src = tag.rte+qp;
            if(top.__r3z && top.__r3z.aid) return;
            __r3z = top.__r3z || { }; __r3z.aid = tag.aid;
            __r3z.sid = sd;
            if(tag.nid && tag.nid != ("[NETWORK"+"_ID]"))
            __r3z.nid = __r3z.nid || tag.nid;
```

-continued

```
            if(tag.cid && tag.cid != ("[CONFIG"+"_ID]"))
__r3z.cid = __r3z.cid || tag.cid;
            if(tag.lnd && tag.lnd != ("${CPG"+"_ID}"))
__r3z.APN_LINE_ITEM_ID = tag.lnd;
            if(tag.did && tag.did != ("[DEAL"+"_ID]"))
__r3z.did = tag.did;
                __r3z.tpm = top.R3Z_TPM || { };
            if(tag.pld && tag.pld !=
("[PLACEMENT"+"_ID]")) __r3z.pld = tag.pld;
            if(tag.vtg && tag.vtg != ("[VAST"+"_TAG]"))
__r3z.vastTagUrl = tag.vtg;
            if(tag.app) __r3z.app = 1;
            if(tag.app && tag.apd && tag.apd !=
("${EXT"+"_APP"+"_ID}")) __r3z.apd = tag.apd;
            if(tag.app && tag.dvd) __r3z.dvd = tag.dvd;
            __r3z.trk = __r3z.trk ||
{imp:[ ],ivw:[ ],ulk:[ ],eng:[ ],clk:[ ],vst:[ ],v25:[ ], v50:[ ],
v75:[ ],ven:[ ],ans:[ ],vjs:[ ]}; setTrackers( );
            if(tag.cap === false) __r3z.DISABLE_CAPPING =
true;
            top.__r3z = __r3z;
            hd = top.document.head ||
top.document.getElementsByTagName("head") [0];
            if(__r3z.app) {
                mr =
top.document.createElement("script");
                mr.src = "https://" + lo + "/mraid.js";
                hd.insertBefore(mr, hd.firstChild);
            }
            s1 = top.document.createElement("script");
            s1.src = tag.nta + "/Ads/" + __r3z.aid + "/" +
tag.lda + "?c=" + tm;
            hd.insertBefore(s1, hd.firstChild);
            if(tag.ntb) {
                s2 =
top.document.createElement("script");
                s2.src = tag.ntb + "/Ads/" + __r3z.aid +
"/" + tag.ldb + "?c=" + tm;
                hd.insertBefore(s2, hd.firstChild);
            }
            function s4( ) {return
Math.floor((1+Math.random( ))*0x10000).toString(16).substr
ing(1);}
        })( );
        </script>
        <!--                                   -->
    </head>
    <body>
        <div id="r3z-addoor" style="">
            <div id="r3z-inst-top" class="r3z-
inst"><span>▼</span>
            <p id="r3z-inst">Please click the play button
below to play the video, content will be unlocked after 6
seconds.</p><span>▼</span></div>
            <div id="r3z-banner-card">
                <div id="r3z-ban"><iframe src="https://r3z-
test-
eu.S3.amazonaws.com/Ads/Fitbit/UKVideo/Mudder20sOct17/mic
rosites/vast/FYIiF/index.html" id="r3z-fwifrm"
class="r3z-ifrm" scrolling="no" style="height: 416.25px;"
frameborder="0"></iframe></div>
                <div class="r3z-iact" id="r3z-qna"
style="display:none">
                    <p id="r3z-quest">What is the answer?</p>
                    <div id="r3z-anslst"><a class="r3z-but r3z-
ansbut r3z-ansbut-1 r3z-ans-1" style="width:
47.5%;"><span>42</span></a>
                        <div class="r3z-anssep"></div><a
class="r3z-but r3z-ansbut r3z-ansbut-2 r3z-ans-2"
style="width: 47.5%;"><span>21</span></a></div>
                </div>
                <div class="r3z-iact" id="r3z-try"
style="display:none">
                    <p id="r3z-hint">Hint: It's the answer to
the universe</p>
                    <div id="r3z-trybut" class="r3z-but">Try
Again</div>
                </div><iframe src="https://r3z-test-
eu.S3.amazonaws.com/Ads/Fitbit/UKVideo/Mudder20sOct17/XSi
```

-continued

```
Frm.html" id="r3z-ifrm" scrollings"no"
frameborder="0"></iframe></div>
            <a href="#r3z-addoor">
                <div id="r3z-inst-bot" class="r3z-inst"
style="width: 750px;"><span>▲</span>
                    <p>Please click the play button above to
play the video, content will be unlocked after 6
seconds.</p><span>▲</span></div>
                </a>
            </div>
    </body>
</html>
```

In the body tag of the HTML snippet, there's an iframe with a source set to the location of the VAST microsite. Once that iframe is defined the contents of the source are loaded within. Displaying the VAST video within the FreeWall.

```
<html lang="en">
<head>
    <meta charset="UTF-8">
    <title>VAST FreeWall</title>
    <link rel="stylesheet" type="text/css"
href="style.css">
    <link rel="preload"
href="https://adservice.google.com/adsid/integrator.js?do
main=r3z-test-eu.s3.amazonaws.com" as="script">
    <script type="text/javascript"
src="https://adservice.google.com/adsid/integrator.js?dom
ain=r3z-test-eu.s3.amazonaws.com"></script>
</head>
<body>
    <img id="background" src="background.jpg">
    <div id="mainContainer">
        <div id="content">
            <video id="contentElement">
            </video>
        </div>
        <div id="adContainer">
            <div style="position: absolute; width: 1455px;
height: 818p><;"><iframe
src="https://imasdk.googleapis.com/js/core/bridge3.201.0_
en.html#goog_299375711" allowfullscreen="" style="border:
0px none; opacity: 0; margin: 0px; padding: 0px;
position: relative;" width="1455"
height="818"></iframex/div>
        </div>
    </div>
    <img id="playButton" src="playbutton.png">
    <img id="volOffButton"
src="data:image/svg+xml;base64,PHN2ZyB4bWxuczpzdmc9Imh0dH
A6Ly93d3cudzMub3JnLzIwMDAvc3ZnIiB4bWxucz0iaHR0cDovL3d3dy5
3My5vcmcvMjAwMC9zdmciIHhtbDpzcGFjZT0icHJlc2VydmUiIHZlcnNp
b249IjEiIHdpZHRoPSI1NjEuOSIgaGVpZ2h0PSI1NjEuOSIgdmlld0Jve
D0iMCAwIDEwNS40IDEwNS4zIj48c3R5bGU+LnMwe2ZpbGw6bm9uZTtzdH
Jva2UtbGluZWNhcDpyb3VuZDtzdHJva2UtbGlu0ZXJsaW1pdDoxO3N0cm9
rZS13aWR0aDo0LjU7c3Ryb2tl0iNmZmY7fTwvc3R5bGU+PGNpcmNsZSBj
eD0iNTIuNyIgY3k9IjUyLjY1IiByPSI1MC44IiBzdHlsZT0iZmlsbC1vc
GFjaXR50jAuNTtmaWxsOiMwMDA7c3Ryb2tlLXdpZHRoOjMuODtzdHJva2
U6I2ZmZiIvPjxwb2x5Z29uIHBvaW50cz0iMzkuNCAxMy44IDIyLjIgMjg
uNiA2IDI4LjYgNiA0Ny43IDIyIDQ3LjcgMzkuNCA2Mi44IDM1LjOgMTMu
OCAiIHRyYW5zZm9ybT0idHJhbnNsYXRlKDguMjUzOTM5NCwxNC4xMjAyM
ikiIHN0eWxlPSJmaWxsOm5vbmU7c3Ryb2tlLWxpbmVqb2luOnJvdW5kO3
N0cm9rZS13aWR0aDozLjg7c3Ryb2tl0iNmZmYiLz48ZyB0cmFuc2Zvcm0
9InRyYW5zbGF0ZSgxMjcuOTYyNzcsMTA3LjM1M0NjM4KSIgc3Ryb2tlPSIj
ZmZmIj48cGF0aCBkPSJNLTcwLjMtMzkuMDYtMzkuMDItNzAuMzMiLz48cG
F0aCBkPSJNLTcwLjMtMzkuMDItMzkuMDYtNzAuMzMiLz48L2c+PHJlY3Q
gilGNsYXNzPSJzMCIvPjxwYXRoIGQ9Im0tMzkuMDItMzkuMDYtMzEuMjgtMzEuMj
giIGNsYXNzPSJzMCIvPjwvZz48L3N2Zz4K">
    <img id="volOnButton"
src="data:image/svg+xml;base64,PHN2ZyB4bWxuczpzdmc9Imh0dH
A6Ly93d3cudzMub3JnLzIwMDAvc3ZnIiB4bWxucz0iaHR0cDovL3d3dy5
3My5vcmcvMjAwMC9zdmciIHhtbDpzcGFjZT0icHJlc2VydmUiIHZlcnNp
b249IjEiIHdpZHRoPSI1NjEuOSIgaGVpZ2h0PSI1NjEuOSIgdmlld0Jve
D0iMCAwIDEwNS40IDEwNS4zIj48Y2lyY2xlIGN4PSI1Mi43IiBjeT0iNT
IuNiIgcj0iNTAuOCIgc3R5bGU9ImZpbGwtb3BhY2l0eTowLjU7ZmlsbDo
jMDAwO3N0cm9rZS13aWR0aDozLjg7c3Ryb2tl0iNmZmYiLz48cG9seWdv
biBwb2ludHM9IjYgNDcuNyAyMiA0Ny43IDM5LjOgNjIuOCAzOS40OIDEzL
jggMzkuNCAxMy44IDIyLjIgMjguNiA2IDI4LjYgIiB0cmFuc2Zvcm09In
```

-continued

```
RyYW5zbGF0ZSg4LjI1Mzk0MDksMTQuMDYxNTU1KSIgc3R5bGU9ImZpbGw
6bm9uZTtzdHJva2UtbGluZWpvaW46cm91bmO7c3Ryb2tlLXdpZHRoOjMu
ODtzdHJva2U6I2ZmZiIvPjxwYXRoIGO9Im01My4zIDcxLjNjOC02LjMgM
TOuNi0xMi43IDE0LjYtMTguN2wwIDBjMC02LTYuNi0xMi40LTE0LjYtMT
guOGwwIDBjNi4zIDExLjcgNi4zIDI1LjggMCAzNy41bTE3LjUtMTguN2M
wIDYuMy01LjIgMTIuMi0xMi4zIDE4LjJsMCAwYzEyLTYuMSAyMi4yLTEy
LjUgMjIuMi0xOC4ybDAgMGMwLTUuNy0xMC4zLTEyLjEtMjIuMi0xOC4yb
DAgMGM3LjEgNi4xAxMi4zIDExLjkgMTIuMyAxOC4ybTEyLjggMGMwIDUuNi
02LjMgMTAuOS0xNS4yIDE2LjFsMCAwYzUuOC0yLjMgMTEuMi00LjYgMTU
uNC03bDAgMGM2LjIgOtMy41IDkuNy02LjYgOS43LTkuMmwwIDBjMC01LTEx
LjItMTAuNi0yNS4xLTE2LjIgFsMCAwYzkgNS4yIDE1LjIgMTAuNSAxNS4yI
DE2LjEiIGZpbGw9IiNmZmYiLz48L3N2Zz4K">
    <div id="console" style="display:none"></div>
    <div id="progressBar"></div>
    <script
scr="https://s0.2mdn.net/instream/video/client.js"
async="" type="text/javascript"></script>
    <script type="text/javascript"
src="//imasdk.googleapis.com/js/sdkloader/ima3.js"></scri
pt>
    <script type="text/javascript"
src="app.js?a5f71ee4ddb8e263096c"></script>
</body>
</html>
```

The above snippet shows the contents of the microsite as they are loaded within the Video FreeWall®.

Explanation Around Supporting Different Video Tags

VideoFreeWall® can support multiple types of VASTN-PAID video tag. This isn't a feature directly handled by VideoFreeWall®, but a feature of the IAM SDK being used by the VideoFreeWall®. The IAM SDK will support any tag that conform to the format specified by the IAB in the Video Ad Serving Template document (VAST) or Video Player-Ad Interface document (VPAID). The code embedded below is called at the end of the initialisation phase of the VideoFreeWall®, and describes what happens in order for the VAST or VPAID video to be requested. Highlighting the fact that nothing specific is done in order to support different video tags. The SDK will try and request whatever tag it is provided with.

```
function setUpIMA( ) {
    // set parameters for the IMA SDK
    ...
    // Request video ads.
    const adsRequest = new google.ima.AdsRequest( );
    adsRequest.adTagUrl = AD_TAG_URL;
    // set ad slot sizes
    ...
    // disable autoplay
    ...
    // make the request for the ad
    adsLoader.requestAds(adsRequest);
}
```

Time to Unlock

Time to unlock is a config parameter given in seconds which dictates how long the video will play for before the content is unlocked.

```
// a global property is provided in the microsite for the
Video FreeWall ®,
// this gets set to the number of seconds the user is
required to watch before the content unlocks
let ART_UNLOCK_TIME;        // time to unlock article in
seconds
The ART_UNLOCK_TIME property gets set during the load phase of the
VideoFreeWall ®.
function load( ) {
    // don't activate if using an old version of internet
explorer
    ...
    // extract the vast video configuration
    microsite.extractConfig<VastConfig>( ).then((config)
=> {
        // get the vast tag and expand its tracking
macros
        ...
        // get the unlock time provided by the FreeWall ®
configuration
        ART_UNLOCK_TIME = config.timeToRelease;
```

```
        // set a safety timeout based on the load timeout
and the
        // time until the article unlocks
        ...
        // set the background for the video FreeWall ®
        ...
        // initialise the video player
        ...
    });
}
```

Pausing Code

The code used for pausing the video is handled by Google's IMA SDK.

Once initialised, the IMA SDK makes use of an ads manager object in order to handle the pausing event. The below code snippets are taken from the source code of the VideoFreeWall®, and are the only occurrences of when the pause function gets called.

The first occurrence of the pause event gets triggered within the listen2FW function. The listen2FW function is a message handler which handles messaging between the FreeWall® component and the video component. The below will get triggered once the FreeWall® unit is scrolled out of view.

```
function listen2FW(e) {
    // validate and check the source of the message
    ...
    // if the message source comes from the FreeWall ®
then check the
    // subject of the source
    ...
    // if the source is "View", then pause the video as
this indicates
    // that the FreeWall ® has been scrolled out of view
    adsManager.pause( );
    // else see if there's any FreeWall ® data which will
be used when
    // firing events to track the video
    ...
}
```

The second occurrence of the pause event gets triggered by the SafetyTimer function. The safety timer gets executed after a period of time if there's a problem with the ad.

If the video FreeWall® is playing on an iPhone, then pauses to the video need to be explicitly communicated as pauses on the native player aren't recognised by the IMA SDK.

```
function SafetyTimer( ) {
    // define properties that hold information about the
video
    ...
    // define a safety shutdown that gets called when a
problem is
    // detected with the video
    ...
    function checkPlayTime( ) {
        // see if the video isn't playing in order to
stop incrementing
        // video status counter
        ...
        // if the video has previously played and is
not playing now but
            // it hasn't been paused, then effectively
trigger pause, we only need
```

```
            // to do this for iphones to account for when
the video is paused
                // inside the native player
                if (isIphone
                    && lastRemainingTime < totalVideoLength
                    && notPlayingTime > PAUSE_TIMEOUT *
MS_IN_SEC) {
                    adsManager.pause( );
                }
            // if the video is playing then make sure the
play button isn't
                // visible and reset informatino about the video
                ...
        }
}
```

Potential advantages of some embodiments of the present invention are that content for display on electronic devices can be controlled to ensure that users are more actively engaged in meeting gatekeeper requirements, such as more actively viewing video ads; that video ads are more likely to be activated by users to access content; and that the ads retain increased visibility by users.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for displaying content including a first part and a second part within an electronic device, including:
    displaying a first part of the content in a first display area of a display prior to display of the second part and prior to playback of an ad comprising a video;
    displaying the ad comprising the video in a second display area while the first part of the content is displayed in the first display area and prior to display of the second part;
    revealing the second part of the content within a third display area once the ad has played back a predefined portion of the video while the ad composing the video is displayed in the second display area, wherein the first display area, the second display area and the third display area are provided within a same scrollable page;
    continuing playback of the video past the predefined portion of the video after the second part of the content has been fully revealed in the third display area; and pausing playback of the video if the video becomes at least partially non-visible due to scrolling of the page,
wherein the second part of the content is revealed within the third display area if the ad has not played back the predefined portion of the video and after a period of time during which playback of the video in the ad is not detected exceeds a timeout period.

2. A method as claimed in claim 1, wherein the content is visually static content.

3. A method as claimed in claim 2, wherein the visually static content is text or image content.

4. A method as claimed in claim 1, wherein the page is a web-page displayed on the electronic device.

5. A method as claimed in claim 1, further comprising receiving a user input to actuate playback of the video.

6. A method as claimed in claim 5, wherein the video is requested and received from an external source in response to receiving the user input to actuate playback of the video.

7. A method as claimed in claim 6, wherein the second part of the content is revealed based on an error in receiving the video from the external source being detected.

8. A method as claimed in claim 1, wherein the first display area remains visible when the second part of the content is revealed.

9. A method as claimed in claim 1, wherein, once the video has been played back, a static image is displayed within the second display area.

10. A method as claimed in claim 1, wherein the second display area is displayed between the first display area and the third display area.

11. A method as claimed in claim 1, wherein the second part of the content is revealed in response to user actuation of a user interface element.

12. A method as claimed in claim 1, wherein the content and the ad are displayed within an application executing on the electronic device.

13. A method as claimed in claim 1, further including the step of retrieving the content from a first server.

14. A method as claimed in claim 13, further including the step of retrieving the ad from a second server.

15. A method as claimed in claim 1, wherein display of the ad and revealing of the second part of the content is controlled by a javascript module.

16. An electronic device, including:
a memory; and
a processor coupled to the memory and configured to:
display a first part of a content including the first part and a second part in a first display area of a display prior to display of the second part and prior to playback of an ad comprising a video;
display the ad comprising the video in a second display area while the first part of the content is displayed in the first display area and prior to display of the second part;
reveal the second of the content within a third display area once the ad has played back a predefined portion of the video while the ad composing the video is displayed in the second display area, wherein the first display area, the second display area and the third display area are provided within a same scrollable page;
continue playback of the video past the predefined portion of the video after the second part of the content has been fully revealed in the third display area; and
pause playback of the video if the video becomes at least partially non-visible due to scrolling of the page,
wherein the second part of the content is revealed within the third display area if the ad has not played back the predefined portion of the video and after a period of time during which playback of the video in the ad is not detected exceeds a timeout period.

17. A non-transitory computer-readable storage medium having stored therein a program comprising instructions for execution by a processor of an electronic device for displaying content including a first part and a second part, wherein the program upon execution by the processor causes the electronic device to operate by:
displaying a first part of the content in a first display area of a display prior to display of the second part and prior to playback of an ad comprising a video;
displaying the ad comprising the video in a second display area while the first part of the content is displayed in the first display area and prior to display of the second part;
revealing the second part of the content within a third display area once the ad has played back a predefined portion of the video while the ad composing the video is displayed in the second display area, wherein the first display area, the second display area and the third display area are provided within a same scrollable page;
continuing playback of the video past the predefined portion of the video after the second part of the content has been fully revealed in the third display area; and
pausing playback of the video if the video becomes at least partially non-visible due to scrolling of the page,
wherein the second part of the content is revealed within the third display area if the ad has not played back the predefined portion of the video and after a period of time during which playback of the video in the ad is not detected exceeds a timeout period.

\* \* \* \* \*